Dec. 27, 1927.

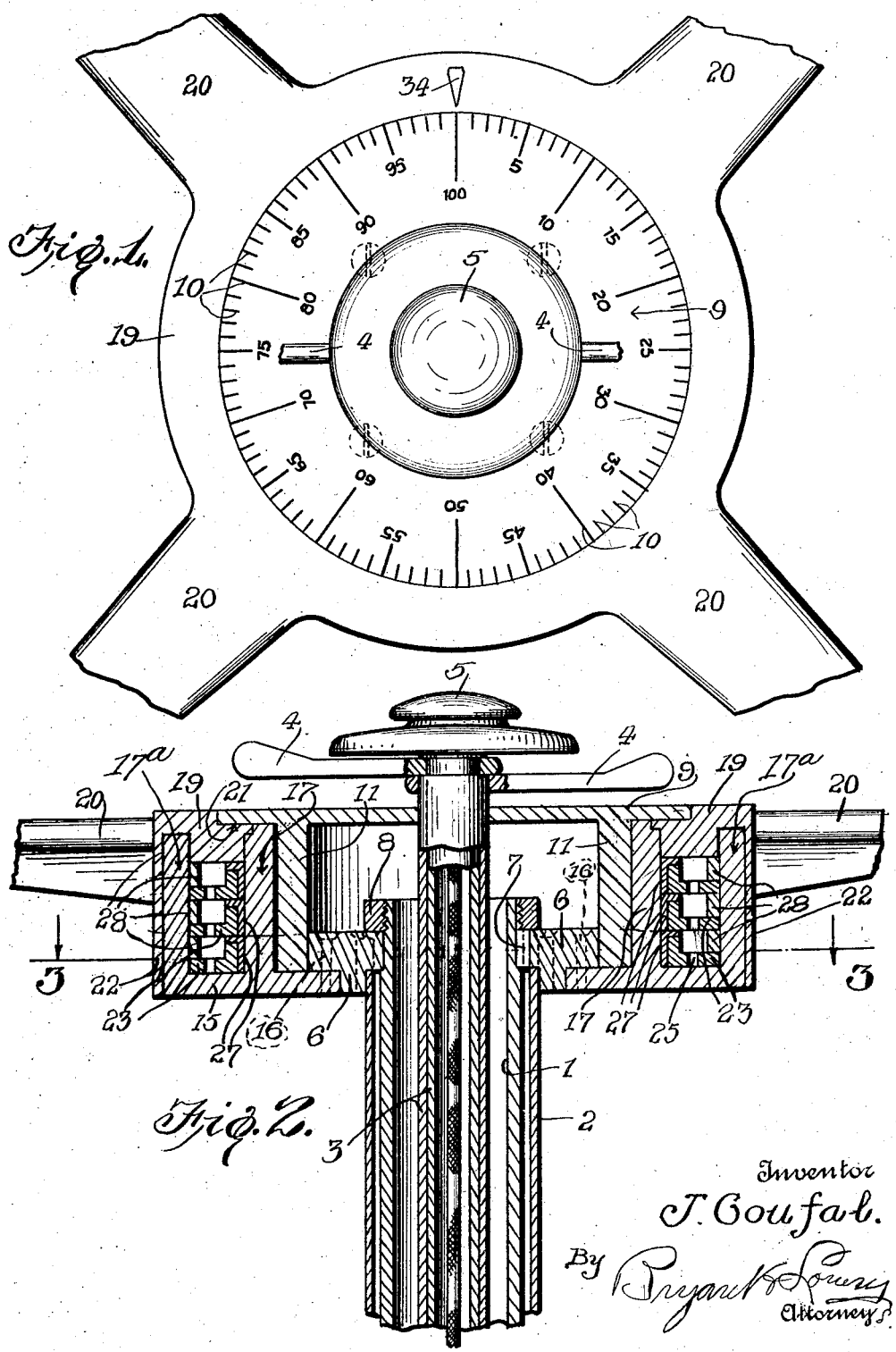

J. COUFAL 1,654,456

LOCK FOR AUTOMOBILE STEERING WHEELS

Filed Aug. 28, 1926     3 Sheets-Sheet 2

Inventor
J. Coufal.
By Bryant & Lowry
Attorneys

Dec. 27, 1927.  
J. COUFAL  
1,654,456  
LOCK FOR AUTOMOBILE STEERING WHEELS  
Filed Aug. 28, 1926  
3 Sheets-Sheet 3
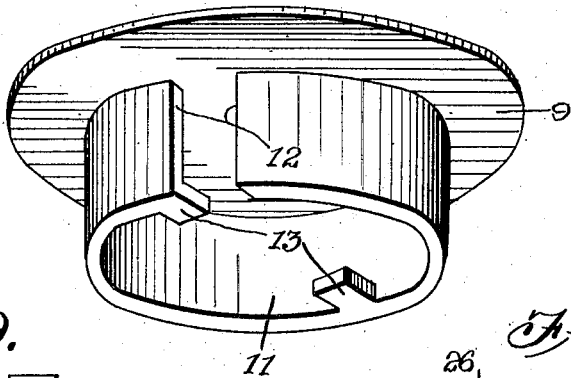
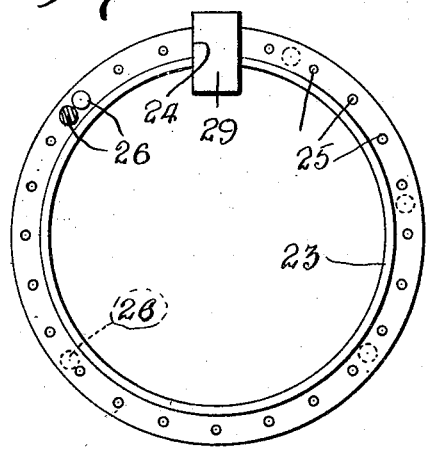 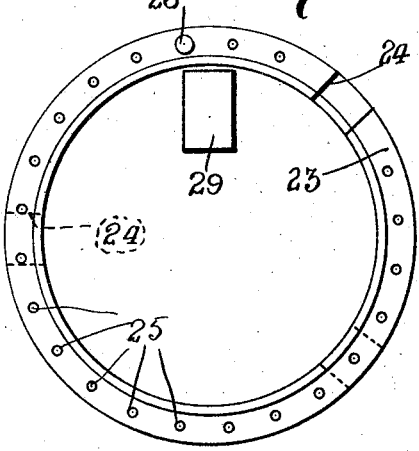
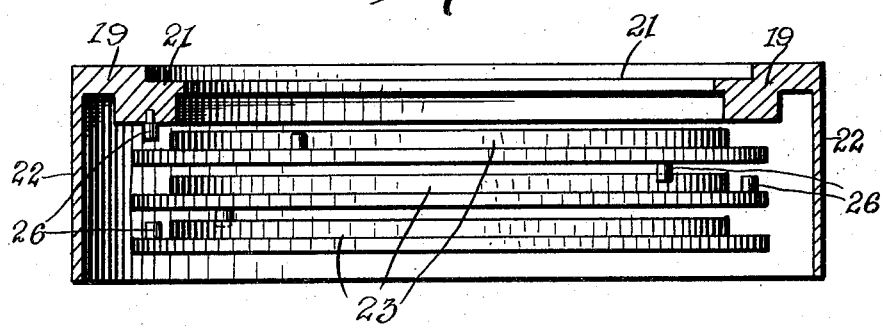

Patented Dec. 27, 1927.

1,654,456

UNITED STATES PATENT OFFICE.

JOHN COUFAL, OF BOMARTON, TEXAS.

LOCK FOR AUTOMOBILE STEERING WHEELS.

Application filed August 28, 1926. Serial No. 132,099.

This invention relates to certain new and useful improvements in locks for automobile steering wheels.

The primary object of the invention is to provide a lock for the steering wheels of automobiles wherein a lock of the permutation type embodying a plurality of ring tumblers is operable to permit pre-rotation of the steering wheel in either direction without affecting the steering mechanism of the automobile when the lock is released and being further operable for locking the steering wheel to the steering post to hold the steering wheel immovable relative to the steering post.

A further object of the invention is to provide a lock of the above type wherein the permutation mechanism of the lock is axially disposed at the head of the steering post with the hub of the steering wheel forming a part of the lock mechanism to effect operation of the several lock tumblers to permit the steering wheel to be locked to the steering post or dis-engaged therefrom.

With the above and other general objects in view that will became apparent as the nature of the invention is better understood, the same consists in the novel form, combination and arrangement of parts hereinafter more fully described, shown in the accompanying drawings and claimed.

In the accompanying drawings, wherein like reference numerals are employed to indicate corresponding parts throughout the several views, Figure 1 is a top plan view illustrating the hub portion of an automobile steering wheel and showing the dial for the permutation mechanism of the steering wheel lock;

Figure 2 is a vertical cross sectional view through the steering wheel shown in Figure 1 with a portion of the steering column and post and showing the tumbler rings housed within the steering wheel hub;

Figure 8 is a perspective view of the dial plate;

Figure 9 is a top plan view of one of the tumbler rings showing the several openings therein to receive the tumbler pins and with the locking plugs positioned between the split ends of the tumbler rings;

Figure 10 is a plan view of one of the tumbler rings showing the locking plug positioned inwardly thereof with the ring partly rotated to displace the split ends thereof from registry with the locking plug; and Figure 11 is a view partly in section and elevation of the steering wheel hub and tumbler rings to illustrate the tumbler pins.

Figure 3:
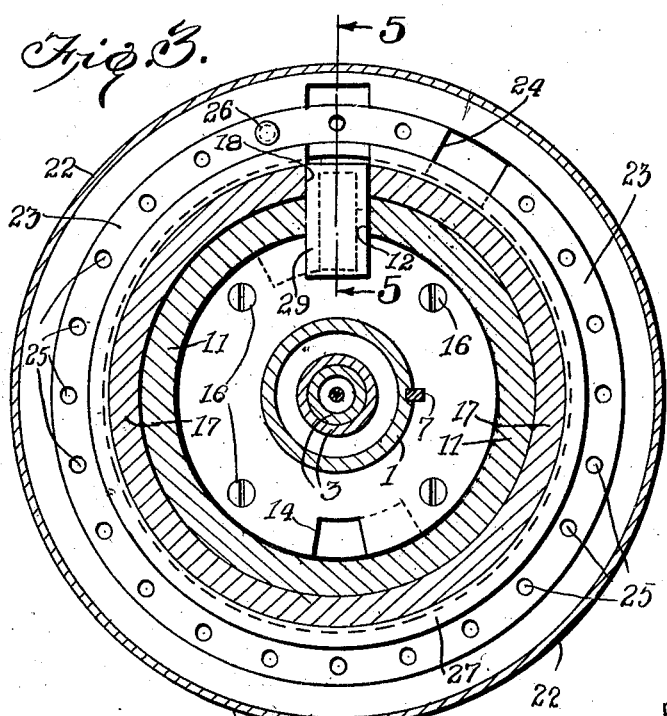
Figure 3 is a horizontal sectional view taken on line 3—3 of Figure 2 showing the locking pin or plug positioned inwardly of the tumbler rings to permit free rotation of the steering wheel independently of the steering post.

The permutation lock mechanism is interposed between the head of the steering post and the steering wheel of the automobile, the steering post 1 being inclosed by the usual steering column 2 and enclosing the tubular shafts 3 having the gas and spark levers 4 at their upper ends that are located in proximity to the horn button 5 in the usual manner as illustrated in Figures 1 and 2. A circular block 6 having a central opening therein is received on the upper end of the steering post 1 and is keyed thereto as at 7, the block 6 being further retained in position by the nut 8 threaded onto the upper end of the steering post and engaging the upper side of the block.

Figure 4:
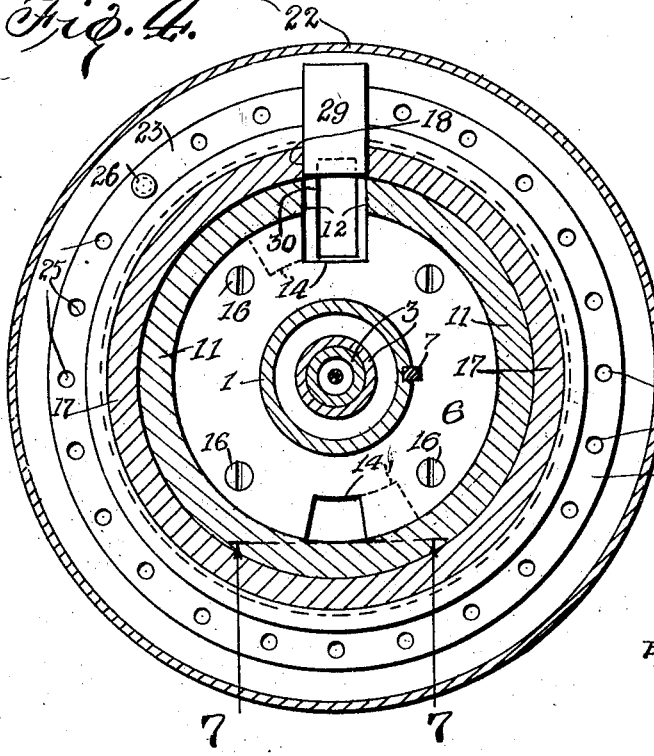
Figure 4 is a horizontal sectional view similar to Figure 3 showing the locking pin or plug shifted outwardly into registering slots of the tumbler rings for locking the steering wheel to the steering post.
Figure 6:
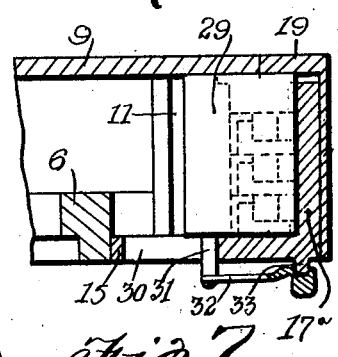
Figure 6 is a detail sectional view, similar to Figure 5, showing the locking plug moved outwardly into engagement with the tumbler rings for locking the steering wheel to the steering post.
Figure 7:
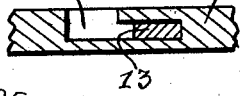
Figure 7 is a detailed sectional view taken on line 7—7 of Figure 4 to show the interlocking connection between the dial plate of the lock mechanism and the steering post.

The circular dial plate 9 that is graduated upon its upper face as at 10 carries a depending annular wall 11 set inwardly from the peripheral edge of the dial plate, the annular wall 11 having a cut away portion forming a side slot 12 while diametrically opposite lugs 13 extend inwardly from the lower edge of the annular wall as clearly shown in Figures 3, 4 and 8. A central opening is formed in the dial plate 9 and through which the spark and gas tubes 3 extend with the lower edge of the annular wall 11 inclosing the circular block 6 while the inwardly directed lugs 13 carried by the wall 11 enter bayonet slots 14 in the block 6 to form an interlocking connection with the block and to hold the dial plate, block and steering post 1 relatively immovable.

A part of the mechanism casing or housing for the lock structure includes a disk plate 15 having a central opening to receive and engage the lower peripheral shouldered edge of the block 6 and is anchored to the block by the screws 16. An upstanding annular wall 17 is carried by the disk plate 15 and being spaced inwardly from the peripheral edge of the disk plate surrounds and rotatably engages the annular wall 11 that depends from the dial plate with the two walls 11 and 17 relatively disposed as shown in Figure 2. The wall 17 is cut away as shown in Figures 3 and 4 to provide a slot 18 that registers with the slot 12 in the wall 11. The outer edge of the dial plate 9 extends outwardly of the upstanding annular wall 17 while the outer edge of the disk plate 15 extends outwardly of the peripheral edge of the dial plate 9, and has an upstanding annular wall 17a at its peripheral edge.

The steering wheel comprises a hub ring 19 carrying the usual spider arms 20 and said hub ring as shown in Figures 2 and 11 is provided with an annular seat 21 in its upper side that receives the peripheral edge of the dial plate 9. A depending angular skirt 22 is carried by the peripheral edge of the hub ring 19 that encloses the disk plate 15. The annular chamber between the upstanding walls 17 and 17a receives the tumbler rings of the lock mechanism.

A plurality of tumbler rings 23 are arranged one upon the other and each has a cut away portion to provide a slot 24 that is movable into registration with slots 12 and 18 of the annular walls 11 and 17. Each tumbler ring 23 is of angle formation in cross section as illustrated, and has the horizontal flange thereof provided with a plurality of openings 25 for the selective reception of tumbler pins 26, the intermediate rings as shown in Figure 11 having tumbler pins 26 one projecting upwardly and the other depending therefrom while the lower tumbler ring carries an upwardly projecting tumbler pin. A depending tumbler pin is carried by the hub ring 19 as shown in Figure 11. The several tumbler rings are arranged as shown in Figure 2 and are held in spaced relation by the spacers 27 and 28. As shown in Figures 3 to 6, a locking block 29 is radially shiftable within the housing for the lock mechanism, the disk plate 15 having a radial slot 30 therein through which the pin 31 depending from the block 29 extends, the finger piece 32 carried by the pin 31 being moved into engagement with the knob 33 when the block 29 is shifted outwardly to hold the same against accidental displacement.

Figure 5:
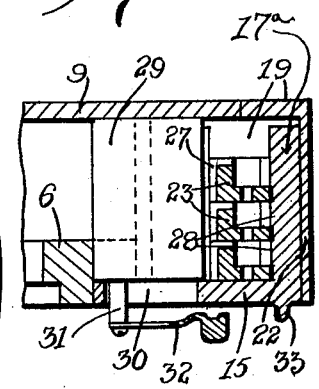
Figure 5 is a detail sectional view showing the locking plug positioned inwardly of the tumbler rings when the steering wheel is disengaged from the steering post.

When the block 29 is in the position shown in Figure 5, the same extends into the registering slots 12 and 18 of the annular walls 11 and 17 and is positioned inwardly of the tumbler rings 23. In this position, the outer edge of the block 29 is spaced inwardly of the hub ring 19 and tumbler rings 23 to permit free rotary movement of the steering wheel independently of the steering post 1. When the block 29 is moved outwardly into the registering slots 24 of the tumbler rings, the block as shown in Figure 4 forms an interlocking connection between the annular wall 17 and the hub ring 19 and as the annular wall 17 is locked to the steering post 1, the hub ring of the steering wheel is also locked to said post to permit steering movement. To move the slots from the several rings 23 into registration, the steering wheel is rotated in reverse directions to position the pointer 34 at the proper graduation 10 upon the dial plate 9 and during such reverse rotations of the steering wheel, the tumbler pins 26 shift the tumbler rings to move the slots 24 thereof into registration with the slots 12 and 18 of the annular walls 11 and 17. When the block 29 is moved into the slots 12 and 18 the steering wheel is permitted to revolve freely upon the steering post and when said block is shifted outwardly to be positioned in the wall slot 18 and registering slots 24 of the tumbler rings, the steering wheel is locked to the post. When the wheel is locked to the post as above described, the block 29 is in the position shown in Figures 4 and 6, and at this time, it is not necessary to operate the permutation mechanism to disengage the wheel from the post, the block 29 being shifted inwardly by the handle 32 to accomplish the separation. It is only necessary to operate the permutation mechanism to place the steering wheel in locked engagement with the post.

From the above detailed description of the device, it is believed that the construction and operation thereof will at once be apparent, and while there is herein shown and described the preferred embodiment of the present invention it is, nevertheless, to be understood, that minor changes may be made therein without departing from the spirit and scope of the invention as claimed.

Having thus described my invention, I claim:—

1. In a lock for automobile steering wheels, a steering post, a steering wheel journaled thereon, permutation controlled lock devices interposed between the post and steering wheel for anchoring the wheel to the post, said lock devices including a dial plate fixed to the post and a pointer on the wheel cooperating with the dial plate, an annular wall immovable relative to the dial plate, an annular skirt carried by the wheel inclosing the wall and spaced therefrom, ring tumblers freely rotatable between the wall and skirt and operable upon rotation of the steering wheel, and a radially shiftable block controlled in its outward movement by said tumblers for connecting the wall and wheel.

2. In a lock for automobile steering wheels, a steering post, a steering wheel journaled thereon, permutation controlled lock devices interposed between the post and steering wheel for anchoring the wheel to the post, said lock devices including a dial plate fixed to the post and a pointer on the wheel cooperating with the dial plate, an annular wall immovable relative to the dial plate, an annular skirt carried by the wheel inclosing the wall and spaced therefrom, ring tumblers freely rotatable between the wall and skirt and operable upon rotation of the steering wheel, a radially shiftable block controlled in its outward movement by said tumblers for connecting the wall and wheel, said tumblers having split ends forming slots adapted to be moved into registry for passage of the block, each ring being of angle formation in cross section, anti-friction spacers for the rings, there being spaced openings in the rings for selective reception of tumbler pins, and a master tumbler pin depending from the steering wheel.

3. In a lock for automobile steering wheels, a steering post, a steering wheel journaled thereon, permutation controlled lock devices interposed between the post and steering wheel for anchoring the wheel to the post, said lock devices including a dial plate fixed to the post and a pointer on the wheel cooperating with the dial plate, an annular wall immovable relative to the dial plate, an annular skirt carried by the wheel inclosing the wall and spaced therefrom, ring tumblers freely rotatable between the wall and skirt and operable upon rotation of the steering wheel, a radially shiftable block controlled in its outward movement by said tumblers for connecting the wall and wheel, a finger piece for shifting the block and a catch for holding the block in position when the steering wheel is locked to the post.

In testimony whereof I affix my signature.

JOHN COUFAL.